United States Patent
Kuruma et al.

[11] Patent Number: 6,034,444
[45] Date of Patent: Mar. 7, 2000

[54] POWER SUPPLY SYSTEM

[75] Inventors: Akio Kuruma; Yoshihide Miyazawa, both of Tokyo; Tetsuya Mochizuki, Yamanashi; Toshio Hatakeyama, Kanagawa; Shinichi Narasaki, Kanagawa; Yoshishige Okuhara, Kanagawa, all of Japan

[73] Assignees: NEC Corporation, Tokyo; Fuji Electric Co., Ltd., Kawasaki, both of Japan

[21] Appl. No.: 09/025,310

[22] Filed: Feb. 18, 1998

[30] Foreign Application Priority Data

Feb. 18, 1997 [JP] Japan .................................. 9-033856

[51] Int. Cl.⁷ ........................................ H02J 1/00
[52] U.S. Cl. .................. 307/80; 307/64; 307/126; 364/528.3
[58] Field of Search .................. 307/43, 64, 65, 307/80, 85, 86, 66, 125; 364/528.21, 528.27, 528.28, 528.3; 361/90; 707/126

[56] References Cited

U.S. PATENT DOCUMENTS

| | | | |
|---|---|---|---|
| 4,197,432 | 4/1980 | Tiedt | 379/413 |
| 4,638,175 | 1/1987 | Bradford et al. | 307/80 |
| 4,677,566 | 6/1987 | Whittaker et al. | 364/528.3 |
| 5,182,464 | 1/1993 | Woodworth et al. | 307/64 |
| 5,594,286 | 1/1997 | Tachikawa | 307/43 |
| 5,740,023 | 4/1998 | Brooke et al. | 363/65 |

FOREIGN PATENT DOCUMENTS 5-274061  10/1993  Japan .
9-5351    1/1997   Japan .

*Primary Examiner*—Albert W. Paladini
*Attorney, Agent, or Firm*—Foley & Lardner

[57] ABSTRACT

A power supply system includes a plurality of power supply devices which are mounted in a mount region and a control [means] unit (namely, a central processing unit), The control [means] unit is connected to the power supply devices and sets a power supply quantity to be supplied to an external load apparatus. [Herein,] The power supply devices are assigned connection positions as addresses in the mount region[, respectively]. Further, the power supply devices send the connection positions as connection position signals into the control [means] unit. The control means determines the number of the power supply devices based upon the connection position signals and sets the power supply quantity based upon the number.

12 Claims, 6 Drawing Sheets

POWER SUPPLY SYSTEM

BACKGROUND OF THE INVENTION

This invention relates to a power supply system, and in particular, to a power supply system which has a plurality of power supply devices including a redundant power supply device.

The quantity of electricity which is required to be produced by a power supply system is variable because the number of necessary peripheral devices is variable in accordance with required functions.

An operation of the power supply system is classified into a mode (referred to as a non-redundant operation mode) in which the power supply devices are operated in parallel with the number (referred to as a required power supply device number) of the power supply devices selected in accordance with the required electrical quantity, and a second mode (referred to as a redundant operation mode) in which the number of power supply devices that are operated is larger than the required power supply device number.

During the operation of the power supply system, an abnormality sometimes occurs for the power supply device. In this event, the abnormality must be detected to deal with.

To this end, disclosure has been made about an example of such a power supply system in Japanese Unexamined Patent Publication No. Hei. 5-274061. In the power supply system disclosed in the publication, a plurality of power supply modules (namely, power supply devices) are connected in parallel. Each of the power supply modules has a switching circuit and an abnormal detection circuit. In this case, the switching circuit supplies an output voltage by performing a switching operation while the abnormal detection circuit detects the abnormality of the output voltage which is supplied from the switching circuit.

In the above conventional power supply system, when the abnormality occurs in at least one of the plurality of power supply modules, the abnormal detection circuit which is connected to the abnormal power supply module detects the abnormality and supplies an abnormal signal. The abnormal signal from the abnormal detection circuit is given to the switching circuit. The switching circuit halts the switching operation and turns on a LED to display a abnormal state. When an operator recognizes the lighting of the LED, the operator separates the power supply module having the abnormality which corresponds to the lightening LED from the power supply system.

However, the above conventional system can not recognize whether or not the power supply device having the abnormality corresponds to the required power supply device or the redundant power supply device. Consequently, even when it is unnecessary to halt the total power supply system because the abnormality occurs in only the redundant power supply device, the total power supply system is necessarily halted to separate the power supply device having the abnormality from the power supply system.

To solve this problem, suggestion has been made about the power supply system which can recognize the abnormality of the redundant power supply device in Japanese Patent Application No. Hei. 9-5351. In this system, the total power supply system is not halted when the abnormality of the redundant power supply device is detected.

However, in such a power supply system, when the electrical quantity necessary for the external load apparatus is determined, the required power supply device number in accordance with the electrical quantity furnished the load must be set to the power supply system. Consequently, the operator must operate a switch or a key by opening a checking portion of the power supply system to manually input the required power supply device number. This manual input must be carried out every when the required electrical quantity is changed. This setting operation (namely, manual input) is troublesome for the operator. Further, the operator may erroneously input or set the number.

SUMMARY OF THE INVENTION

It is therefore an object of this invention to provide a power supply system which is capable of automatically setting a required power supply device number only by connecting or inserting the required power supply devices to a mount region without manually inputting the number.

It is a general object of this invention to provide a power supply system which is capable of easily recognizing whether or not an abnormality, occurs in a redundant power supply device.

According to this invention, a power supply system includes a plurality of power supply devices which are mounted in a mount region and a control means (namely, a central processing unit). The control means is connected to the power supply devices and sets a power supply quantity to be supplied to an external load apparatus.

Herein, the power supply devices are assigned connection positions as addresses in the mount region, respectively. Further, the power supply devices send the connection positions as connection position signals into the control means. The control means determines the number of the power supply devices based upon the connection position signals and sets the power supply quantity based upon the number.

In this event, the power supply devices are divided into first power supply devices which are requisite for the electrical quantity and second power supply devices which are not requisite for the electrical quantity and which are redundant. The connection positions have first connection positions which correspond to the first power supply devices and second connection positions which correspond to the second power supply devices. The control means determines the first number (namely, the required power supply device number) of the first power supply devices based upon the first connection positions.

Thus, the required power supply device number is automatically determined based upon the connection position of the power supply devices in the power supply system according to this invention. Consequently, it is unnecessary for the operator to manually input the number.

DESCRIPTION OF THE PREFERRED EMBODIMENTS

Referring to drawings, description will be made about a power supply system according to embodiments of this invention.

Herein, the minimum number of the power supply devices which is required for a maximum load connected to a power supply system is represented by Nmax (Nmax is an integral number which satisfies Nmax>0) while the number of redundant power supply devices is represented by M (M is an integral number which satisfies M≧0). In this case, the total number of power supply devices in the system is Nmax+M. Further, the power supply system has Nmax+M position in a mount region for connecting or inserting the power supply devices. In this event, the mount region is assigned addresses (namely, numbers), respectively. Consequently, the power supply devices which are connected or inserted in the mount region have the addresses, respectively.

Moreover, the positions in the mount region are divided in advanced into positions for connecting the required power supply devices and positions for connecting the redundant power supply devices. For instance, the addresses 1 through Nmax correspond to the positions for connecting the required power supply devices while the addresses (Nmax+1) through (Nmax+M) correspond to the positions for connecting the redundant power supply devices.

Herein, the required power supply device number is variable in accordance with the load. Consequently, the power supply devices of Nmax are not always connected or inserted in the mount region. For instance, the power supply devices of N are connected to N positions among 1 to Nmax addresses while (Nmax+1) to (Nmax+M) addresses becomes spaces (i.e., vacant) in the non-redundant operation mode. On the other hand, the power supply devices of N are connected to the N positions among 1 to Nmax addresses while the power supply devices of m are connected to m positions among (Nmax+1) to (Nmax+M) addresses in the redundant operation mode in which M power supply devices are connected to the power supply system in addition to the required N power supply devices.

Figure 1:
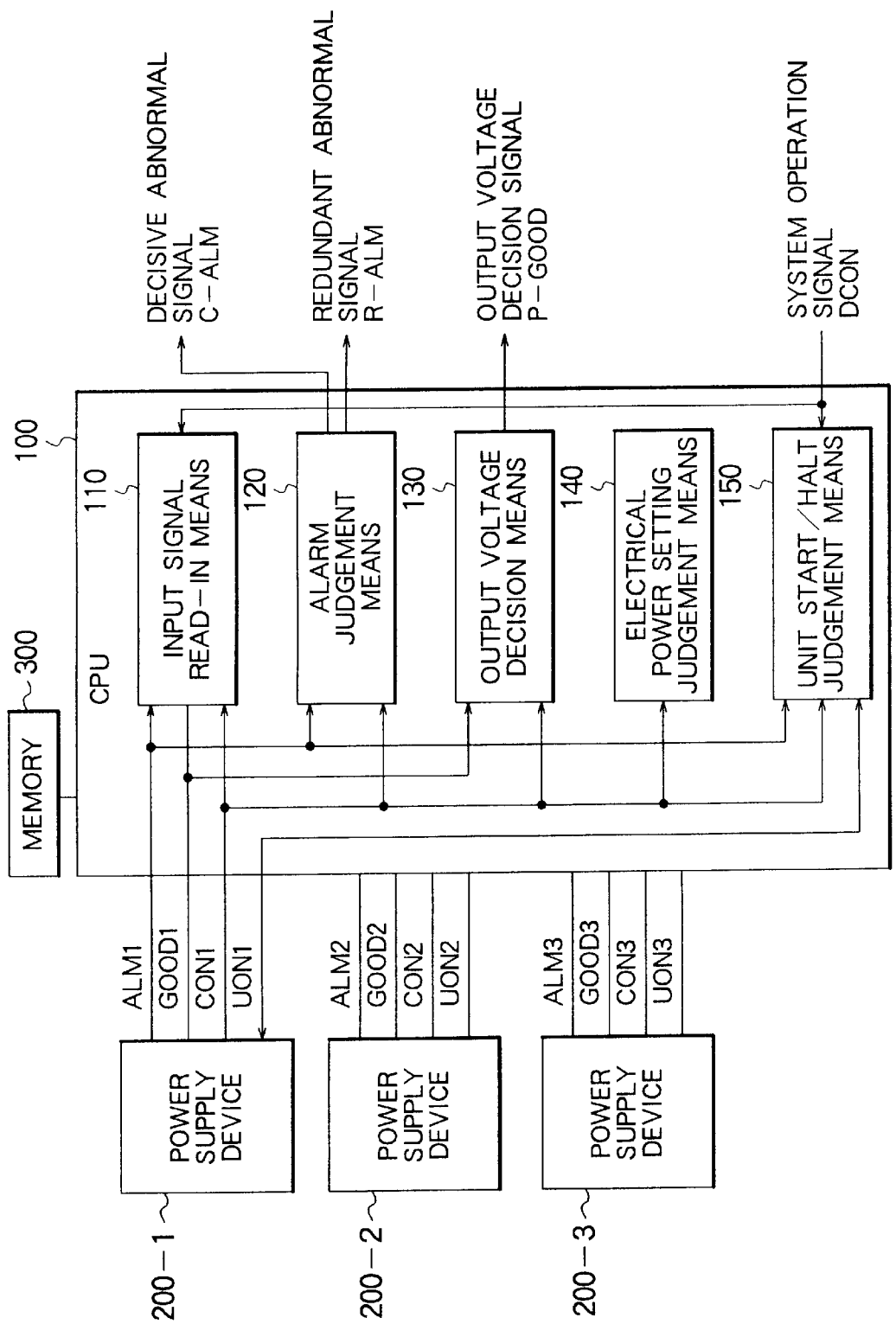
FIG. 1 is a block diagram showing a power supply system according to this invention.

The power supply system illustrated in FIG. 1 is specified by Nmax=2 and M=1. Accordingly, the mount region has three positions specified by addresses of 1 to 3. In this case, the addresses 1 and 2 correspond to the positions for connecting the required power supply devices while the address 3 corresponds to the position for connecting the redundant power supply device.

The illustrated power supply system includes a central processing unit (CPU) 100. A plurality of power supply devices 200-1, 200-2 and 200-3 are connected to the central processing unit 100. Further, a memory 300 and an apparatus (not shown) to be supplied electrical power from the power supply devices 200-1, 200-2 and 200-3 are connected to the central processing unit 100. Thereinafter, the apparatus to be supplied the electrical power will be referred to as an external load apparatus.

Herein, the address in the mount region is assigned for each of the power supply devices as the number of the power supply device. Consequently, the power supply devices 200-1, 200-2 and 200-3 are connected or inserted to the positions of the numbers 1, 2 and 3 in the mount region, respectively.

In this event, each of the power supply devices 200-1, 200-2 and 200-3 is replaceable during an operation of the power supply system. The power supply device outputs a connection state signal CONn★ as a connection position signal, an output voltage normal signal GOODn and a power supply abnormal signal ALMn★ to the central processing unit 100. In this event, the connection state signal CONn★ (n is an integral number of n>0 which indicates the address (namely, number) of the power supply device, and ★ means that TTL is "L" level in an active state and indicates that each power supply device is connected to the connection position in the mount region. Further, the output voltage normal signal GOODn (TTL is "H" level in the active state indicates that the output voltage value of the power supply device is normal. Moreover, the power supply abnormal signal ALM★ indicates that an abnormality is present with respect to the power supply device.

If the connection positions (addresses 1 to 3) of the power supply devices correspond to connection port positions of the signal lines in the CPU 100 with one-to-one correspondence, the signal from each power supply device automatically becomes the signal of the power supply device connected to each address without adding the address information to the signal. Further, it is convenient to use a connector having a power supply output terminal and a signal output terminal so that the connection positions automatically corresponds to connection ports of the signal lines.

The central processing unit 100 reads out a power supply control program and executes it. The power supply control program is stored in a recording medium, such as a magnetic disk. The power supply control program causes to function the central processing unit 100 to function as an input signal read-in means 110, an alarm judgement means 120, an output voltage decision means 130, an electrical power setting judgement means 140 and a unit start/halt judgement means 150 by controlling an operation of the central processing unit 100.

Although the signal flow between blocks 110 to 150 and the power supply devices 200-1 to 200-3 is indicated with respect to only the power supply device 200-1 in FIG. 1 and the signal flow is omitted with respect to the other power supply devices 200-2 and 200-3, the signal flow of the power supply devices 200-2 and 200-3 is similar to that of the power supply device 200-1.

The input signal read-in means 110 inputs the power supply abnormal signal ALMn★, the output voltage normal signal GOODn and the connection state signal CONn★ which are supplied from the power supply devices 200-1, 200-2 and 200-3. Further, the input signal read-in means 110 inputs a system operation signal DCON from the external load apparatus.

The alarm judgement means 120 judges whether or not the redundant power supply devices among the power supply devices 200-1, 200-2 and 200-3 are an abnormal state or whether or not the power supply devices 200-1, 200-2 and 200-3 are a decisive abnormal state based upon the signals which are inputted into the input signal read-in means 110. Herein, the decisive abnormal state means that the abnormality is detected in the power supply devices other than the redundant power supply devices (i.e., the non-redundant power supply devices).

The output voltage decision means 130 detects whether or not the power supply devices 200-1, 200-2 and 200-3 output normal voltages based upon the output voltage normal signal GOODn and the connection state signal CONn★ which are supplied from the power supply devices 200-1, 200-2 and 200-3 and supplies the output voltage decision signal P-GOOD.

The electrical power setting judgement means 140 detects the connection positions at which the respective power supply devices are mounted based upon the connection state signals CONn★ which are supplied from the power supply devices 200-1, 200-2 and 200-3 and determines the number of the power supply devices which are connected to the connection positions of 1 to Nmax addresses as the required power supply device number The unit start/halt judgement means 150 judges whether or not the power supply devices 200-1, 200-2 and 200-3 are normal based upon the alarm power supply abnormal signals ALMn★ and the connection state signals CONn★ which are supplied from the power supply devices and supplies signals UONn for starting and halting each power supply device. In this event, the power supply device is in an operation state when the UONn is in a set (start) state. On the other hand, the power supply device is in a non-operation state when the UONn is in a reset (halt) state.

Subsequently, description will be made about the operation of this embodiment.

Figure 2:
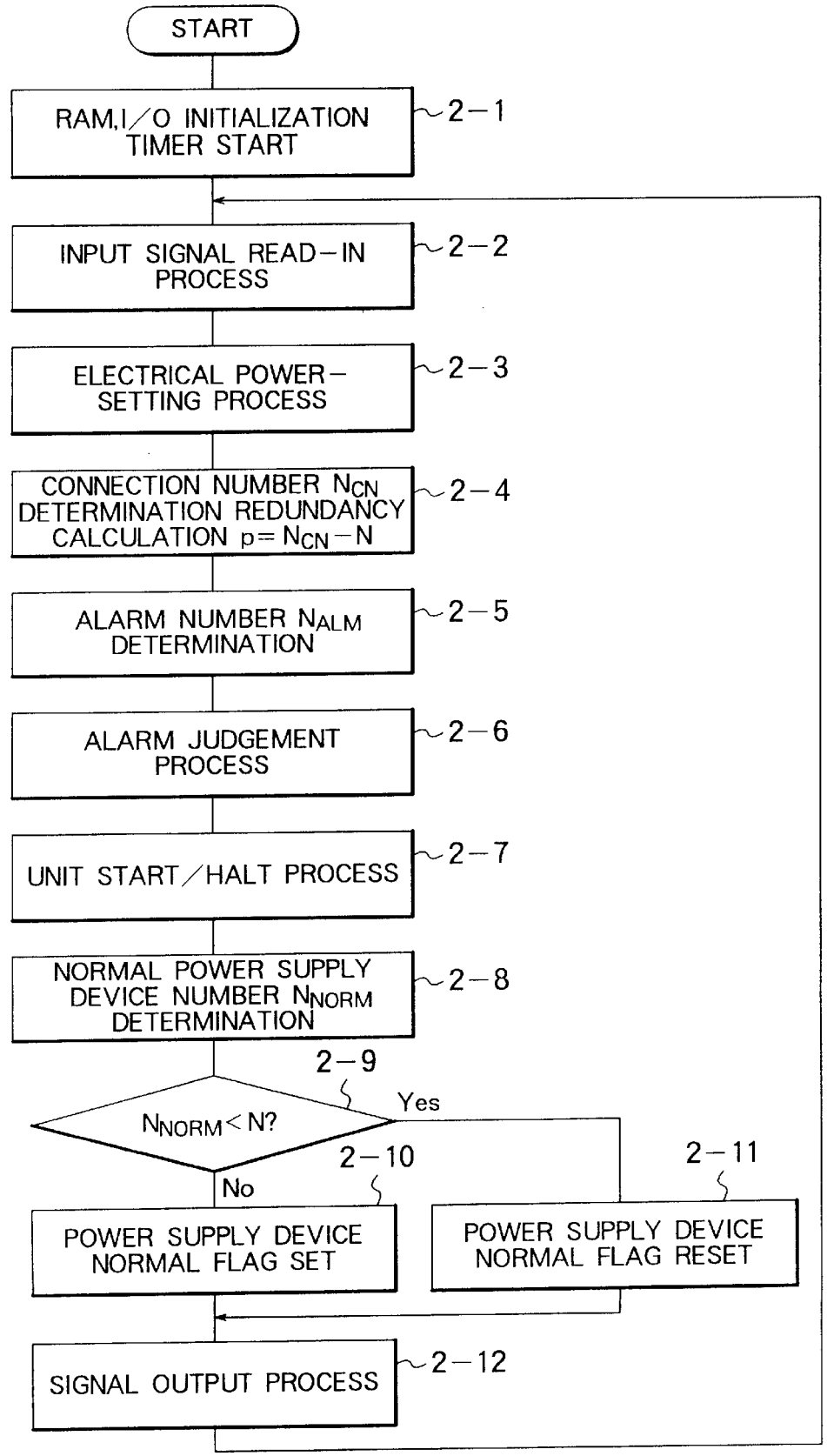
FIG. 2 is a flow chart showing an operation of the power supply system according to this invention.

Referring to FIG. 2, a RAM region and an I/O (input and output interface) region of the central processing unit 100 are initialized in a step 2-1. Further, a timer is prepared and a start operation is executed.

In a step 2-2, the input signal read-in means 110 in the central processing unit 100 inputs signals from the power supply devices and the external load apparatus.

Next, in a step 2-3, the electrical power setting judgement means 150 judges whether or not the setting of the electrical power is terminated. If the setting is not terminated, the electrical power setting judgement means 150 detects the positions at which the power supply devices 200-1, 200-2 and 200-3 are mounted or inserted in the mount region and sets the electrical power based upon the detected positions. Namely, the electrical power setting judgement means 140 sets the required power supply device number N. The detail of this operation will be described later referring to FIG. 3A.

Further, in a step 2-4, the electrical power setting judgement means 140 detects all positions at which the power supply devices are mounted or inserted in the mount region to determine the total number $N_{CN}$ of the power supply devices 200-1, 200-2 and 200-3 which are connected or inserted to the mount region. Consequently, the number P of the redundant power supply devices is determined as $N_{CN}$-N.

In a step 2-5, the alarm judgement means 120 in the central processing unit 100 detects the power supply abnormal signals ALMn★ from the power supply devices to determine the number $N_{ALM}$ of the abnormal power supply devices.

Moreover, in a step 2-6, the alarm judgement means 120 judges the alarm based upon the connection number $N_{CN}$ and the alarm number $N_{ALM}$ to supply the alarm signal. This alarm signal includes the redundant abnormal signal R-ALM and the decisive abnormality signal C-ALM, as mentioned before.

In this event, the total operation of the power supply system is halted when the decisive abnormal signal C-ALM is generated. Thereafter, the abnormal power supply device is replaced to start the operation again. When the redundant abnormal signal R-ALM is generated, the process of the subsequent step 2-7 is carried out. The detail of the alarm process will be described later referring to FIG. 4.

In the step 2-7, the unit start/halt judgement means 150 in the central processing unit 100 performs a start/halt process of the unit and a latch release process of the alarm for each power supply device. The detail of this process will be described later referring to FIG. 5.

Successively, the output voltage decision means 130 determines the number Nnorm of the normal power supply devices to deliver the output voltage decision signal P-GOOD to the external load apparatus (not shown) (step 2-8). Further, the number Nnorm is compared with the number N of the power supply devices which is determined by the electrical setting process of the step 2-3 (step 2-9).

Thereafter, ON/OFF of the output voltage decision signal P-GOOD is determined based upon the comparison result of the step 2-9. In case of Nnorm≧N, the output voltage decision signal P-GOOD is put into an ON state. Thereby, a power supply normal flag is set (step 2-10). In case of Nnorm<N, the output voltage decision signal P-GOOD is put into an OFF state. Consequently, the power supply normal flag is reset (step 2-11).

Finally, the central processing unit 100 performs a signal output process to supply the signals which has been determined so far into the power supply devices and the external load apparatus together (step 2-12). The above successive process is repeated with one cycle.

Subsequently, referring to FIG. 3A, detail description will be made about the electrical power setting process (step 2-3 in FIG. 2) which is carried out by the electrical power setting judgement means 140.

Herein, the mount position of the power supply device 200-3 corresponds to the connection position of the redundant power supply device. In this case, the required power supply device number N is determined by the power supply device 200-1 and the power supply device 200-2.

In a step 3-1, it is judged whether or not the electrical power setting is completed. When the electrical power setting is not completed (for example, when the power supply is introduced), the presence or absence of the connection state signal CON1 is detected to judge whether or not the power supply device is connected to the address 1 in the mount region in a step 3-2.

When the power supply device 200-1 is connected to the address 1, the presence or absence of the connection state signal CON2 of the power supply device 200-2 is successively detected to judge whether or not the power supply device is connected to the address 2 in the mount region (step 3-3). When the power supply device 200-2 is connected or inserted in the mount region, the required power supply device number N is determined as 2 (namely, N=2)in a step 3-4. Thereafter, an electrical power setting completion flag is set (step 3-6).

On the other hand, when it is judged that the power supply device 200-2 is not inserted or connected in the mount region in a step 3-3, the required power supply device number N is determined as 1 (namely, N=1). Thereafter, the electrical power setting completion flag is set in the step 3-6. Thus, the electric power setting process is completed. Further, when it is judged that the power supply device 200-1 is not inserted or connected in the mount region in the step 3-2, the electrical power setting judgement means 140 terminates the electrical power setting process.

When the electrical power setting process is completed in the step 3-1, the electrical power setting judgement means 140 immediately terminates the above electrical power setting process. Thus, the electrical power setting process is completed via the above operation. In this event, this electrical power setting process is executed only once.

Figure 4:
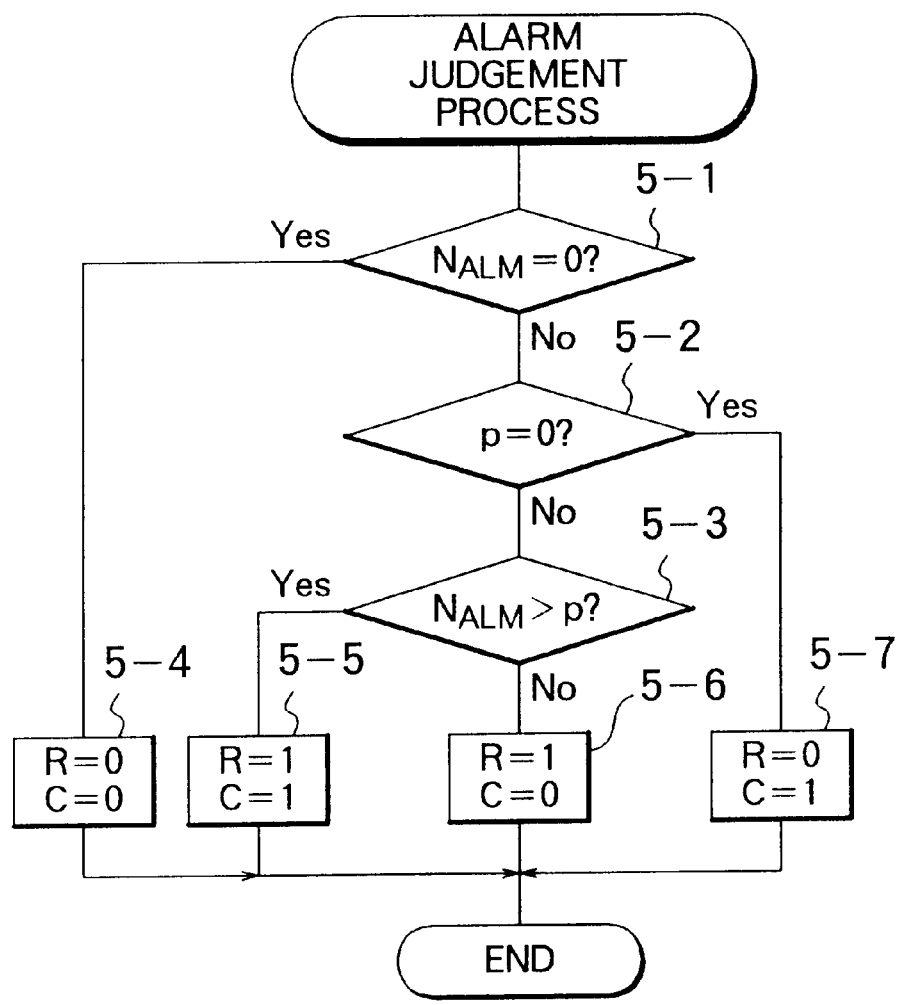
FIG. 4 is a flow chart showing an alarm judgement process.

Subsequently, referring to FIG. 4, description will be made about the alarm judgement process(step 2-6 in FIG. 2) due to the alarm judgement means 120.

Herein, P (the redundant number) which is determined by the connection number determination process and the alarm number $N_{ALM}$ which is determined by the alarm number determination process (step 2-5 in FIG. 2) are used in the alarm judgement process.

In a step 5-1, it is judged whether or not the alarm number is zero. In case of $N_{ALM}=0$, the redundant alarm number R and the decisive alarm number C are determined as 0 (namely, R=0, C=0) in a step 5-4.

In the step 5-1, in case of the alarm number $N_{ALM} \neq 0$, it is judged whether or not the redundant number P is zero (step 5-2). In case of P=0, the redundant alarm number R is is determined as 0 (namely, R=0) and the decisive alarm number C is determined as 1 (namely, C=1) in a step 5-7. Consequently, the decisive abnormal signal C-ALM is generated.

When it is judged that the redundant number P is not zero (namely, P≠0) in the step 5-2, it is judged whether or not the $N_{ALM}$ is more than P (namely, Nalm>P) (step 5-3).

In case of Nalm>P, the redundant alarm number R is determined as 1 (namely, R=1) and the decisive alarm number C is determined as 1 (namely, C=1) in a step 5-5. As a result, both the decisive abnormal signal C-ALM and the redundant abnormality signal R-ALM are generated.

When it is judged that $N_{ALM}$ is not exceeding P in the step 5-3 (namely, Nalm≦P), the redundant alarm number R is determined as 1 (namely, R=1) and the decisive alarm number C is determined as 0 (namely, C=0) in a step 5-6. Consequently, the redundant abnormal signal R-ALM is generated. Thus, the alarm judgement process is completed.

Figure 5:
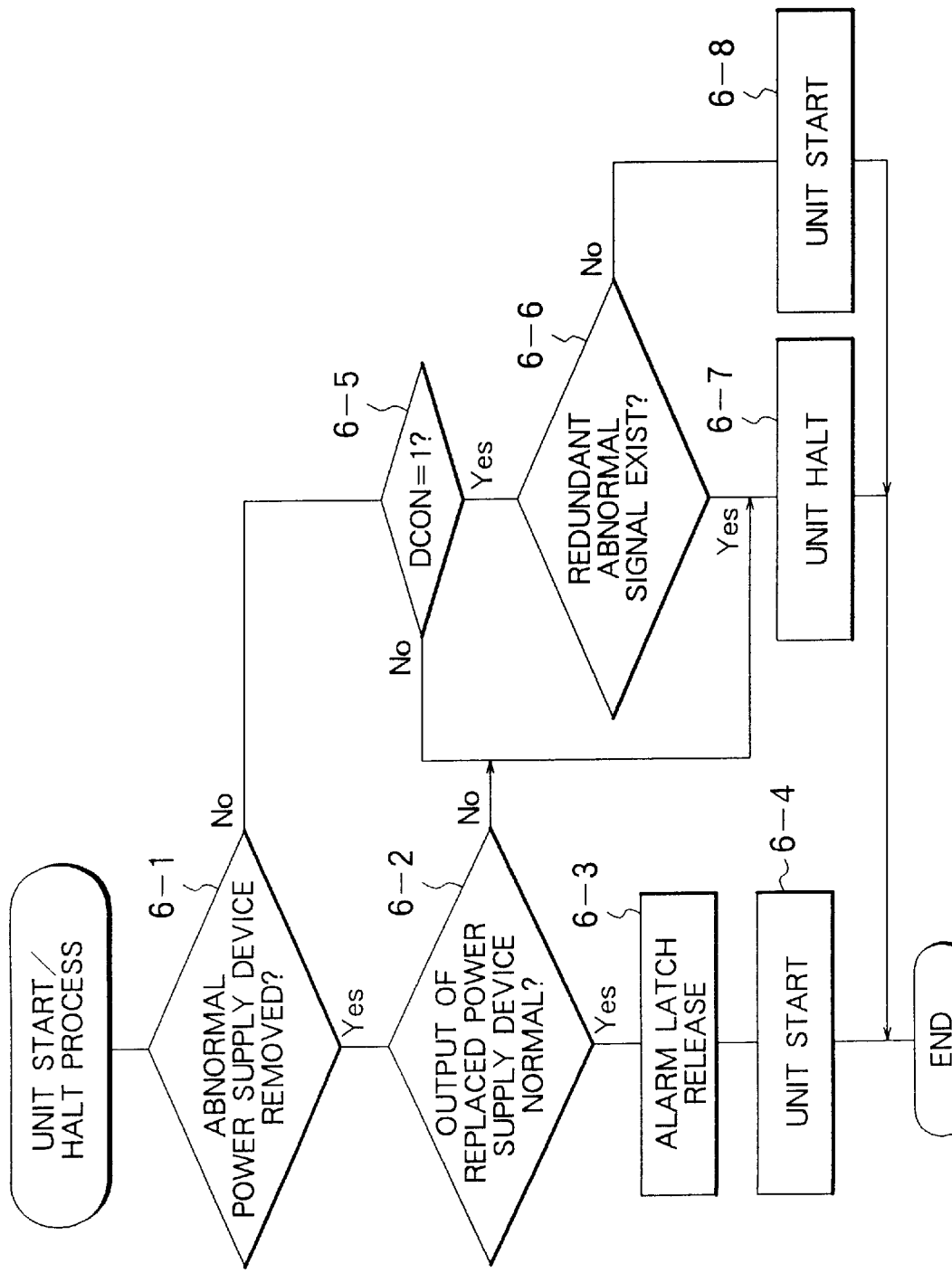
FIG. 5 is a flow chart showing an unit start/halt process.

Subsequently, referring to FIG. 5, description will be made about the unit start/halt process (step 2-7 in FIG. 2) for each power supply device due to the unit start/halt judgement means 150.

In the step 6-1, the presence or absence of the ALMn★, the presence or absence of the redundant abnormal signal R-ALM and the presence or absence of the connection state signal CONn★ are judged, respectively. If the ALMn★ and the redundant abnormal signal R-ALM are generated and the connection state signal CONn★ is not generated, it is judged that the redundant abnormality brings about a disconnection for the corresponding power supply device. Consequently, the power supply device is removed. Thereafter, the-process goes to a step 6-2. If not, the process transfers to a step 6-5.

In the step 6-2, the GOODn signal from the replaced power supply device is checked. If the output is normal, the process goes to a step 6-3. In the step 6-3, the redundant abnormal signal R-ALM is released (alarm latch release) and supplies the UONn signal to start the corresponding power supply device in a step 6-4 (unit start).

If the output is abnormal in the step 6-2, the process goes to a step 6-7 to halt the UONn signal. Consequently, the corresponding power supply device halts without a start (unit halt).

In the step 6-5, it is judged whether or not the system operation signal DCON is delivered from the external load apparatus. If not, the process transfers to the step 6-7 to halt the UONn signal. Consequently, the corresponding power supply device halts (unit halt).

When the system operation signal DCON exists in the step 6-5, the process transfers to a step 6-6 to judge whether or not the redundant abnormal signal R-ALM exists. If exists, the UONn signal is halted to stop the power supply device in the step 6-7 (unit halt).

When it is judged that the redundant abnormal signal does not exist in the step 6-6, the process transfers to a step 6-8 to supply the UNOn signal. Consequently, the power supply device starts in the step 6-8 (unit start). Thus, the start/halt process of one power supply device is carried out. The process is sequentially performed for the remaining power supply devices. When the process is completed for all power supply devices, the unit start/halt process is terminated.

Figures 3A, 3B:
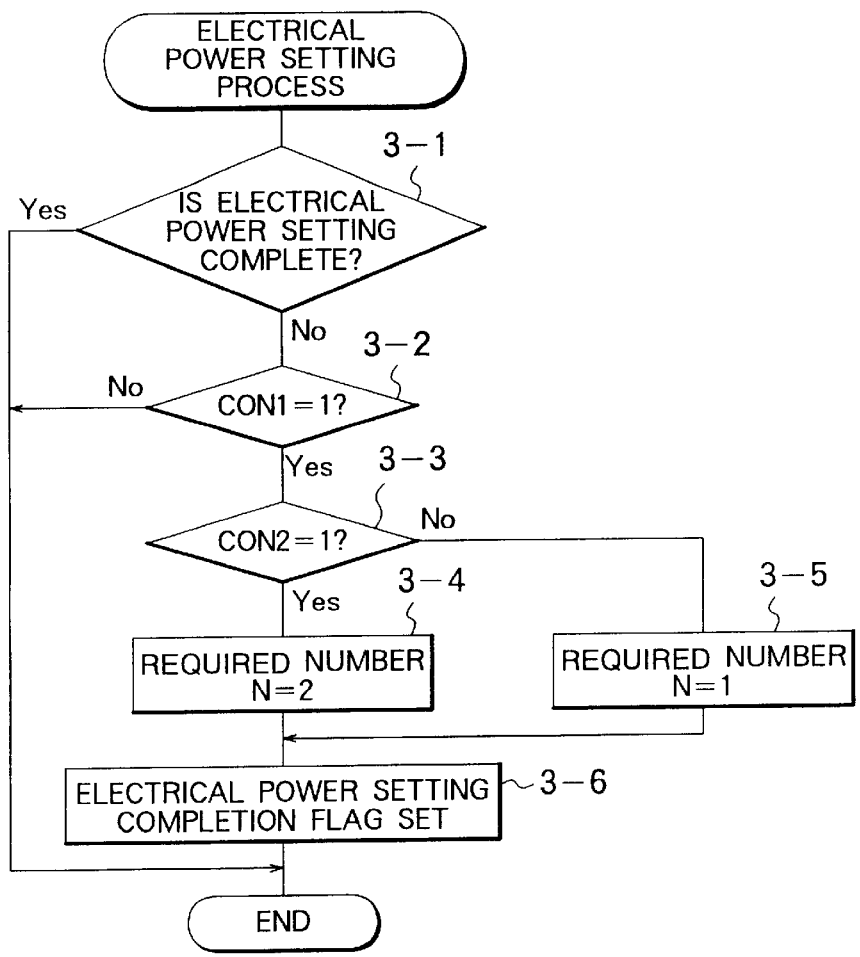
FIG. 3A is a flow chart showing an electrical power setting process of a first embodiment.
FIG. 3B is a table showing a relation between connection positions of the power supply devices and the connection number according to the first embodiment.

As mentioned before, the electrical power setting process of the step 2-3 in FIG. 2 is carried out by the electrical power setting judgement means 140 via the steps 3-2 to 3-6 in FIG. 3A in the power supply system illustrated in FIGS. 1 to 5 when the power supply system is started. Specifically, when the power supply devices 200-1 and 200-2 are mounted or connected to the connection positions (in this example, addresses 1 and 2) for the required power supply devices as shown in FIG. 3B (the power supply devices 200-1, 200-2 and 200-3 are represented as units 1, 2 and 3 in FIG. 3), the required power supply device number N is determined as 2 (namely, N=2) irrespective of whether or not the power supply device is mounted or connected to the connection position (in this example, address 3) of the redundant power supply device.

Further, when the power supply device 200-1 is mounted or connected in the connection position (in this example, the address 1) for the required power supply device and the power supply device 200-2 is not mounted or connected to the connection position (in this example, the address 2)for the required power supply device, the required power supply device number N is determined as 1 (namely, N=1) irrespective of whether or not the power supply device is connected to the connection position (in this example, address 3) of the redundant power supply device. This setting process is performed only by connecting the power supply devices of the required number to the connection positions for the required power supply devices in the mount region. In this event, it is particularly unnecessary to manually input the required power supply device number N. Thereinafter, the process with respect to the abnormality of the power supply device is carried out based upon the above set number.

Now, it is assumed that N=2 is set and the connection number $N_{CN}$ is 3 in the step 2-4 of FIG. 2. Namely, the power supply devices are mounted to all connection positions in the mount region and the power supply system is operated at the redundant operation mode in parallel. In this case, the redundant number P is determined as 1 (namely, P=1) in the step 2-4.

When the abnormality occurs for the power supply device (for example, 200-1) in the operation, the power supply abnormal signal ALM1★ is generated and $N_{ALM}$ is determined in the step 2-5 of FIG. 2. Consequently, R=1 and C=0 are determined in the alarm judgement process in the step 2-6 of FIG. 2. As a result, only the redundant abnormal signal R-ALM is generated without the decisive abnormal signal C-ALM. Therefore, only the power supply device 200-1 is halted in the step 6-7 via the steps 6-1, 6-5 and 6-6 during the process of the power supply device 200-1 in FIG. 5 which corresponds to the unit start/halt process in the step 2-7. Consequently, the power supply system continues to operate at the non-redundant operation mode with the two power supply devices 200-2 and 200-3. During this operation, the abnormal power supply device 200-1 can be replaced by a new power supply device. Thus, when it is possible to operate the power supply devices with the required power supply devices number or more in case of the abnormality of the power supply device, only the redundant power supply device is halted. As a result, it is unnecessary to halt the total power supply system.

Subsequently, description will be made about a second embodiment of this invention.

The second embodiment is similar to the first embodiment except that the electrical power setting process in the electrical power setting judgement means 140 is different from the process of FIG. 3.

The connection positions (in the above example, address 1 and address 2) for mounting the required power supply devices are designated to each other to judge the required power supply device number in FIG. 3A. Specifically, it is first judged whether or not the power supply device 200-1 is connected to the address 1. When not connected, the required power supply number N is determined as 0 (namely, N=0). When connected, it is judged whether or not the power supply device is connected to the address 2.

On the other hand, there is no distinction between the connection positions for connecting the required power supply devices in the second embodiment. Specifically, it is judge whether or not the power supply devices are connected to the connection positions of all the required power supply devices (steps 4-3, 4-4 and 4-5 in FIG. 6). Thus, the connection number is determined (step 4-6) to set the required power supply device number. The second embodiment is similar to the first embodiment except that.

Figures 6A, 6B:
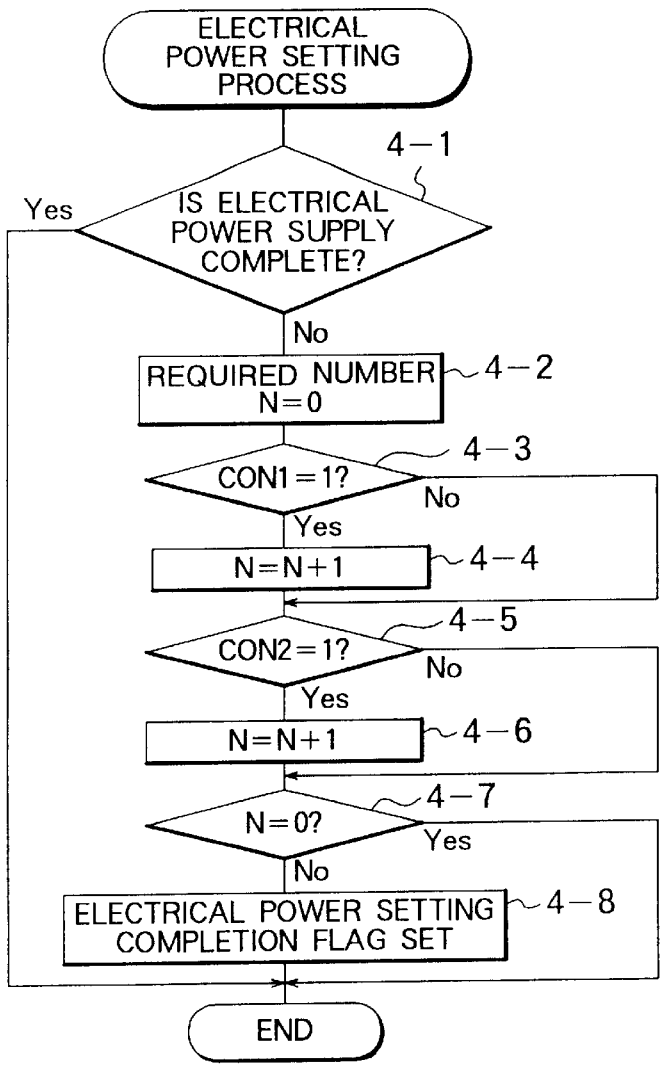
FIG. 6A is a flow chart showing an electrical power setting process of a second embodiment.
FIG. 6B is a table showing a relation between connection positions of the power supply devices and the connection number according to the second embodiment.

Referring to FIG. 6A, the required power supply device number is determined by all the power supply devices 200-1 and 200-2 which are connected to the connection positions of the required power supply devices in this example. Specifically, if CON1★ exists in a step 4-3, "1" is added to N (step 4-4). Successively, CON2★ exists in a step 4-5, "1" is further added to N to become N=2 in a step 4-6. The required power supply device number is determined by the use of N (step 4-7) and an electrical power setting completion flag is finally set (step 4-8). Thus, the electrical power setting process is completed.

As shown in FIG. 6B (the power supply devices 200-1, 200-2 and 200-3 are represented by units 1, 2, and 3, respectively), when the power supply device 200-1 is not connected (namely, the power supply device is not connected to the connection position of the address 1 in the mount region) and the power supply device 200-2 is connected (namely, the power supply device is connected to the connection position of the address 2 in the mount region), the required power supply device number N is determined as 1 (namely, N=1).

According to this embodiment, it is unnecessary to connect the required power supply devices with the address order in the mount region. Namely, the power supply devices can be connected to any connection positions.

What is claimed is:

1. A power supply system which includes a plurality of power supply devices which are mounted in a mount region and a control unit which is connected to the power supply devices for supplying a power supply quantity to an external load apparatus wherein:

said power supply devices are assigned connection positions in the mount region each connection position corresponding to an address;

said power supply devices sending connection position signals corresponding to said connection positions to said control unit means;

said control unit determining the number of said power supply devices mounted on said mount region based upon the connection position signals.

2. A system as claimed in claim 1, wherein said power supply devices are divided into a first number of a first power supply devices which are required for supplying the electrical quantity and a second number of second power supply devices which are redundant; and the connection positions have first connection positions which correspond to said first power supply devices mounted on said mount region and second connection positions which correspond to said second power supply devices mounted on said mount region.

3. A system as claimed in claim 2, wherein:

said control unit determines a number of said first power supply devices based upon the number of first connection positions.

4. A system as claimed in claim 3, wherein:

said control unit determines a total number of said power supply devices based upon the sum of said first and second connection positions, and said control unit determines a second number of said second power supply devices by subtracting the first number from the total number.

5. A system as claimed in claim 2, wherein:

each of said power supply devices supplies a power supply abnormal signal to said control unit, said power supply abnormal signal indicating, in one state thereof, that said power supply device has an abnormality, and said control unit determines a third number of said power supply devices having an abnormality based on said abnormal signal.

6. A system as claimed in claim 5, wherein the control unit generates a decisive abnormal signal to halt operation of the power supply system for supplying said power supply quantity to said external load apparatus when the third number exceeds zero and the second number is equal to zero.

7. A system as claimed in claim 5, wherein:

said control unit generates a redundant abnormal signal while maintaining operation of said power supply system when the third number is equal to or less than the second number.

8. A system as claimed in claim 7, wherein:

each of said power supply devices is replaceable; and said power supply device having the abnormality is replaced in the operation of the power supply system when the control unit generates the redundant abnormal signal.

9. A system as claimed in claim 5, wherein:

said control unit generates a decisive abnormal signal to halt an operation of said power supply system when the third number is exceeding the second number.

10. A system as claimed in claim 5, wherein:

the control unit judges whether or not said power supply devices are normal based upon the connection position signals and the power supply abnormal signals and supplies start/halt signals for starting and halting said power supply devices.

11. A power supply system which includes a plurality of power supply devices which are mounted in a mount region and a control unit which is connected to the power supply devices for supplying a power supply quantity to an external load apparatus, wherein:

said power supply devices includes redundant power supply devices, and each of said power supply devices generates a power supply abnormal signal which indicates in one state thereof, that said power supply device has an abnormality and a connection position signal which corresponds to a connection position which is assigned for each of said power supply devices and supplies the abnormal signal and said connection position signals to said control unit;

said control unit comprises a digital processor programmed to perform the following steps:

inputting the power supply abnormal signals and the connection position signals from said power supply devices;

determining the number of said power supply devices which are available for the electrical quantity based upon the inputted connection position signals;

judging whether or not the abnormality is caused by said redundant power supply devices based upon the inputted signals and the determined number and generating a redundant abnormal signal; and judging whether or not said power supply devices are normal based upon the inputted signals, and supplying start/halt signals for starting and halting said power supply devices.

12. A system as claimed in claim 11, wherein:

each of said power supply devices is replaceable; and said redundant power supply device having the abnormality is replaced in an operation of said power supply system when said redundant abnormal signal is generated.

* * * * *